United States Patent [19]

Roczynski et al.

[11] 4,005,965
[45] Feb. 1, 1977

[54] RECORD PRODUCING APPARATUS

[75] Inventors: Joseph P. Roczynski, Branford; Chester P. Roczynski, Guilford, both of Conn.

[73] Assignee: Valley Metallurgical Processing Co., Inc., New York, N.Y.

[22] Filed: May 27, 1975

[21] Appl. No.: 580,817

[52] U.S. Cl. .............................. 425/315; 425/296; 425/302 R; 425/116; 425/810; 425/455 R; 425/242 R

[51] Int. Cl.² ...................... B29D 17/00; B29C 3/00

[58] Field of Search .......... 425/116, 123, 112, 511, 425/501, 135, 810, 242 R, 38, 318, 315, 302; 249/142

[56] References Cited
UNITED STATES PATENTS

| | | | |
|---|---|---|---|
| 3,496,611 | 2/1970 | Ferdig | 249/142 X |
| 3,640,653 | 2/1972 | Laenen et al. | 425/38 X |
| 3,663,136 | 9/1972 | Westermann | 425/116 |
| 3,717,431 | 2/1973 | Matsuda | 425/318 |
| 3,862,815 | 1/1975 | Roczynski et al. | 425/116 |

Primary Examiner—J. Howard Flint, Jr.
Attorney, Agent, or Firm—Walter Spruegel

[57] ABSTRACT

In record producing apparatus a biscuit mold is formed in upper and lower complemental cup parts with fragmental rims which, on lowering the upper cup part onto the lower cup part for closing the mold cavity to form a biscuit therein, complement each other peripherally to form an uninterrupted annular rim, so that on raising the upper cup part from the lower cup part in opening the mold, the mold cavity is opened not only at the bottom but also at the top for direct exposure of a good part of a formed biscuit to the cooling effect of external air. Further in record producing apparatus, a rotary top disc is lowered and pressed against a molded record on a turntable at a trimming station to participate in the friction drive of the record during trimoff of its peripheral flash, and this top disc is also called upon to transfer a trimmed record from the trimming station to a stacking station at which to release the record for its drop onto a stacking spindle, with the top disc being to this end provided with a mechanical record holder which on the rise of the top disc from the turntable lifts the trimmed record from the latter and holds it below and spaced from the bottom face of the top disc until the latter reaches the end of its record transfer movement to the stacking station. Thus, static electricity generated in the top disc during the friction drive of the record manifests itself as characteristic attraction between top disc and record which, however, fails to be a disturbing factor in stacking the record on the designated spindle at the stacking station because of the deliberate break-up of this attraction on the separation of the record from the bottom face of the top disc when the record holder assumes the hold of the record.

4 Claims, 19 Drawing Figures

RECORD PRODUCING APPARATUS

This invention relates to the production of disc records in general, and to apparatus for producing records in particular.

Record producing apparatus of the type with which the present invention is concerned operate automatically in successive cycles during each of which a disc record is produced, with each cycle providing at least for the forming of a plastic biscuit, transfer of the biscuit to a molding press in which there is formed a record with excess plastic in the form of peripheral flash, transfer of the formed record from the press to a trimming station at which the peripheral flash on the record is trimmed off, and transfer of the trimmed record from the trimming station to a stacking station.

In prior apparatus of this type, a plastic biscuit is formed at a biscuit forming station in a mold having two companion parts in the form of a flat bottom plate and an inverted cup with an annular rim and a center core, of which the cup is movable downwardly into closing relation with the bottom plate to define with the latter a ring-shaped mold cavity in which a plastic biscuit is formed, and upwardly away from the bottom plate to open the mold and leave a formed biscuit resting on the bottom plate, and the bottom plate is guided for horizontal movement from the biscuit forming station forwardly into the open press for transfer of a formed biscuit thereon to the press, and rearwardly to the biscuit forming station for forming the next biscuit. Efficient performance of the biscuit mold requires a transient plasticity pattern of the plastic biscuit charge which must vary between a workable mold injection plasticity and a degree of shape-retaining plasticity at which a formed biscuit will remain at rest on the bottom plate and readily separate in free self-strip fashion from the cup part on raising the latter into open mold position after a permissible closure period of the mold. However, advantageous as the biscuit mold is by virtue of its multi-fuctional performance during which a biscuit rests solely on one and the same support from the beginning of its formation to the end of its transfer to the press, and even though the biscuit mold indeed meets the just mentioned requirements for efficient performance and performs accordingly, it is the very performance of the biscuit mold which adversely affects the record producing rate of the press. Thus, a plastic charge introduced into the mold at any workable injection temperature is too tacky for self-stripping from the cup part on raising the latter in opening the mold, wherefore recourse is had to cooling the biscuit in the closed mold, customarily by a constant external blast of air against the cup part, in order to reduce the plasticity of the biscuit at a rate at which it will cease to stick the cup part and, instead, freely self-strip therefrom on timely opening of the mold. Cooling of a biscuit in the closed mold in this indirect and quite inefficient fashion calls for a permissible injection temperature of the plastic biscuit charge which must be sufficiently low in order that the cooling effect from the closed mold will succeed in reducing the plasticity of the biscuit to the extent required for self-stripping of the same from the cup part on timely opening of the mold. However, while the biscuit mold performs efficiently at this permissible injection temperature of the plastic biscuit charge, this injection temperature is already way below the required temperature of a biscuit for molding it into a record in the press, wherefore the press is called upon to undertake the extensive reheating of the delivered biscuit to record molding temperature before proceeding with the actual molding of the record, with ensuing prolongation of the record molding cycle, and correspondingly reduced record production rate, of the press.

Among prior apparatus of this type is also the one disclosed in our prior U.S. Pat. No. 3,862,815, dated Jan. 28, 1975, which provides in the cup part of the biscuit mold a spring-loaded biscuit stripper plate. While this stripper plate has the advantage of mechanically and, hence, reliably removing from the cup part of the mold a biscuit of a higher temperature at which it would not self-strip from the cup part, it does not dispense with the need for constant external cooling of the cup part to thereby keep the stripper plate at sufficiently low operational temperature to reduce the plasticity of the contacting biscuit for its release therefrom on the rise of the cup part in timely opening the mold.

Further in prior apparatus of this type, a record is transferred from the press onto a turntable for its support on the latter at the trimming station at which a cutting tool or tools trim the peripheral flash from the record while the same is being driven. To the latter end, a rotary top disc at the trimming station is lowered onto the record on the turntable, with either the turntable or top disc being power-driven for the friction drive of the record for the duration of the flash trimming operation thereon. The top disc serves the additional function of transferring the trimmed record from the flash trimming station to the stacking station, and to this end is provided with vacuumatic record holding means in its bottom face, and in addition to being movable vertically to and from the turntable at the trimming station, the top disc is also movable horizontally from the latter station to the stacking station and vice versa. The top disc is advantageous not only by virtue of its multiple participating action in trimming a record and stacking the trimmed record, but also by its uninterrupted hold on a record from the beginning of a trimming operation thereon to the end of its transfer to the stacking station, whereby each record held on the top disc at the stacking station will with its center hole be accurately aligned with the stacking spindle therebeneath as a precondition to most reliable stacking of successive records on their release from the top disc. In reality, however, the stacking of record after record proved to be far less reliable than was expected, and the cause therefor was found to be static electricity generated in the course of driving and trimming a pressed record, with this static electricity manifesting itself as typical attraction between top disc and record which occasionally causes sufficient inertial disturbance in a record to divert it from and thereby miss the stacking spindle on its release from the top disc at the stacking station.

It is a primary object of the present invention to provide for record producing apparatus of this type a biscuit mold which is formed by complemental top and bottom parts and has the same ring-shaped mold cavity and the same advantageous multi-functional biscuit forming and transferring performance as the aforementioned prior biscuit mold, but unlike the latter performs efficiently with a plastic biscuit charge of such high transient temperature as to allow the record molding cycle of the press to be of a duration which is conductive to the molding of quality records at a fairly high record production rate of the press.

It is another object of the present invention to provide for record producing apparatus of this type a biscuit mold of which the complemental top and bottom parts are so arranged that, in the course of raising the top part from the bottom part in opening the mold, the mold cavity is being opened not just at the bottom but also higher up, thereby directly to expose a good part of the formed biscuit to the surrounding atmosphere, or to an external blast of air if resorted to, even while the mold is being opened. By providing in this fashion for direct access of cooling air to a good part of a formed biscuit of the aforementioned high transient temperature particularly while the mold is being opened, the biscuit is cooled apparently more skindeep than in depth so that in opening the mold the biscuit will readily strip from the upper mold part while retaining most of its heat.

It is a further object of the present invention to provide for record producing apparatus of this type a biscuit mold of which the complemental top and bottom parts are arranged for opening the mold cavity at the bottom and also higher up as aforementioned, by providing these top and bottom parts in the form of fragmental cup parts which are inverted to each other, with the upper cup part providing the center core and both cup parts having only fragmental rims which, however, complement each other peripherally to form an uninterrupted annular rim on lowering the upper cup part onto the lower cup part to close the mold. Further, and in order to enable the lower cup part to perform its added biscuit transfer function including release of the biscuit to a press pin on retraction of this cup part from the press, the upright rim fragment on the lower cup part is arranged at the end thereof which trails in the biscuit transfer movement to the press. The fragmental cup parts of the mold are particularly advantageous because in opening the mold the part of the mold cavity which opens higher up from the bottom thereof is the very top of the cavity which thus affords a ready path for cooling air into the interior of the upper cup part wherein the cooling effect of the air on a biscuit therein is particularly effective for ready release of the latter from the rising cup part. The featured cup parts of the mold are further advantageous in that in opening the mold at the end of a biscuit forming cycle, the ensuing upward movement of the fragmental rim on the upper cup part relative to the stationary rim fragment on the lower cup part produces some slight friction between these rim fragments and the respective outer peripheral biscuit surfaces which they bound, with the overall effect of this live friction on the biscuit favoring its release from the ascending cup part and, hence, avoiding any malfunction of the mold in binding a biscuit to the upper cup part from such friction cause. Admission of cooling air into the interior of the upper cup part in the course of opening the mold is even advantageous when resorting to a stripper plate in the upper cup part for positive ejection of a formed biscuit from the interior of the latter, in that the stripper plate, by being exposed to this admitted air while simultaneously in stripping contact with a formed biscuit, will cool the biscuit so rapidly over its contact area therewith that the latter will sustain no appreciable heat loss and release without fail from the stripper plate the moment its ejection is concluded.

It is another important object of the present invention to provide for record producing apparatus of this type a top disc which, like the aforementioned prior top disc, has the advantages of multiple participating action in trimming a record and stacking the same while maintaining an uninterrupted hold on a record from the beginning of a trimming operation thereon to the end of its transfer to the stacking station in accurate operative alignment with a stacking spindle thereat, but for its hold on a record relies on mechanical grippers which in their record holding performance are particularly reliable, and certainly more reliable than vacuumatic holding means by being immune in their action to such factors as shock and vibration which have such unpredictable effects on a vacuumatic hold.

It is a further object of the present invention to provide for record producing apparatus of this type a top disc which has all the aforementioned advantages of the prior top disc and, like the latter, generates in the course of driving and trimming a pressed record static electricity with its manifestation of characteristic attraction between top disc and record, but in which this attraction has been eliminated when releasing the record from the top disc at the stacking station and, hence, is no longer a disturbing factor in stacking records on the designated spindle.

Another object of the present invention is to provide for record producing apparatus of this type a top disc in which the disturbing effect of operational static electricity on record stacking is eliminated as aforementioned, by providing the top disc with a mechanical record holder featuring ledges on which to rest peripheral margins of a trimmed record for its hold to the top disc below and spaced from the bottom surface thereof and with its center hold aligned with the rotary axis of the top disc, with these ledges being arranged to lift a trimmed record from the turntable at the trimming station and hold it to the top disc on the rise of the latter from the turntable and its continued movement to the stacking station at which the ledges are retracted from the record for its release to the stacking spindle. Thus, it is the separation of the trimmed record from the bottom face of the top disc at the very start of the operational rise of the latter at the trimming station which breaks the attracting link between top disc and record, so that the free drop of the released record at the stacking station will unfailingly be onto the stacking spindle. Further, the top disc is preferably provided with a spring-urged plunger or plungers which urge a record on the bottom face of the top disc to separate therefrom, wherefore this action of the plungers will, on the rise of the top disc at the trimming station and during its continued record transfer movement to the stacking station, force the trimmed record into firm and uniform rest on the ledges and, hence, not only avoid any conceivable hang-up of even part of a record on the bottom face of the top disc by some transient effect of static electricity, but also lock the record to the ledges against conceivable displacement thereon from its initial position on lift-off from the turntable in which its center hole remains aligned with the rotary axis of the top disc even at the stacking station for unfailing stacking of transferred records onto the stacking spindle in correct orientation with this axis.

Further objects and advantages will appear to those skilled in the art from the following, considered in conjunction with the accompanying drawings.

In the accompanying drawings, in which certain modes of carrying out the present invention are shown for illustrative purposes.

Figures 1, 2, 9A, 9B, 9C, 14, 15, 16:
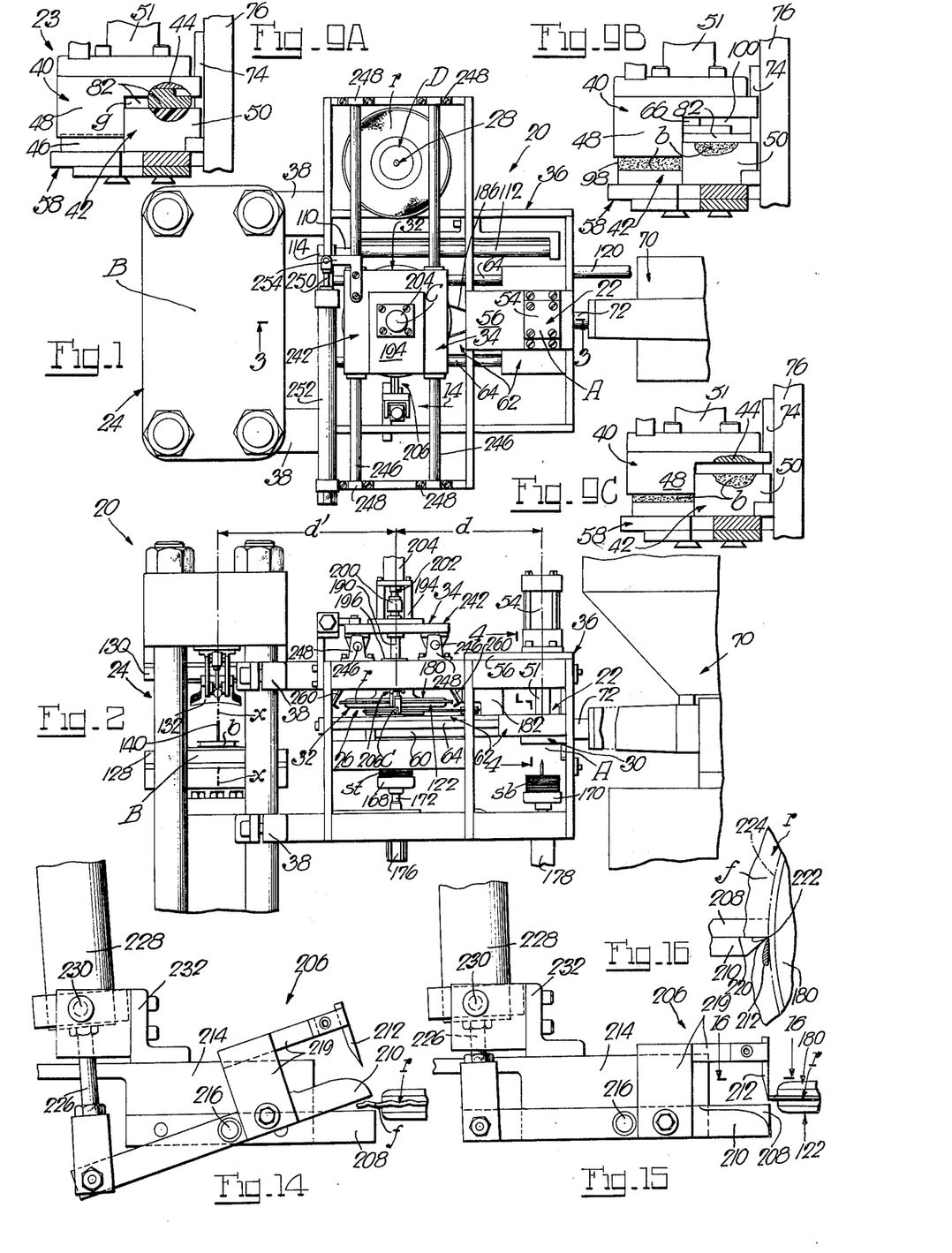
FIG. 1 is a top view of record producing apparatus embodying the invention.
FIG. 2 is a fragmentary side view of the apparatus.
FIGS. 9A and 9B are views similar to FIG. 9 and showing the biscuit mold component of the operating device in different operating positions.
FIG. 9C is a side view of a modified biscuit mold component.
Figure 3:
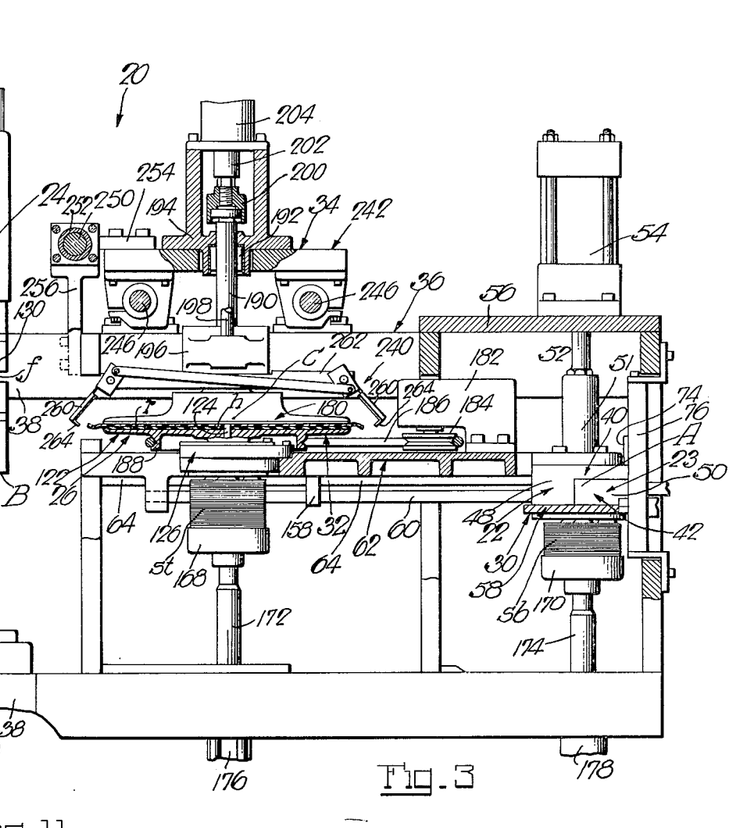
FIG. 3 is an enlarged fragmentary section through the apparatus taken substantially on line 3—3 of FIG. 1.

Referring to the drawings, and more particularly to FIGS. 1 to 3 thereof, the reference numeral 20 designates record producing apparatus having as its major operating components a biscuit forming device 22 at a biscuit forming station A, a record molding press 24 at a press station B, a record trimming device 26 at a record trimming station C, a record stacking device 28 at a record stacking station D, a biscuit transfer device 30, a record transfer device 32, and another record transfer device 34. The general arrangement of these operating devices is the same as in the apparatus disclosed in our aforementioned prior U.S. Pat. No. 3,862,815. The various operating devices 22, 26, 28, 30, 32 and 34 are mounted on a main frame 36 which, in turn, is mounted at 38 on the press 24.

Figure 4:
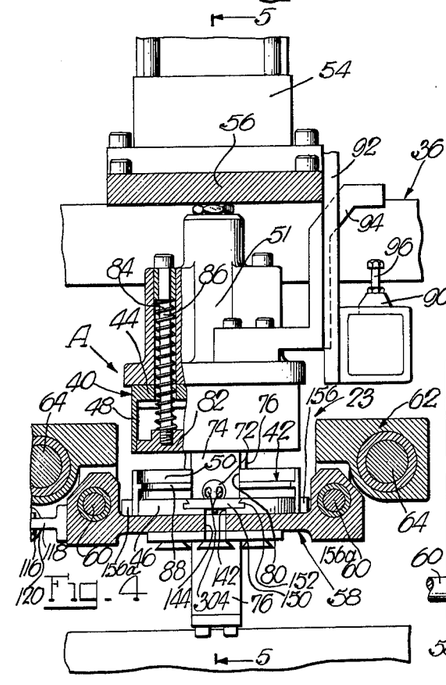
FIG. 4 is an enlarged fragmentary section through the apparatus taken substantially on the line 4—4 of FIG. 2.
Figure 5:
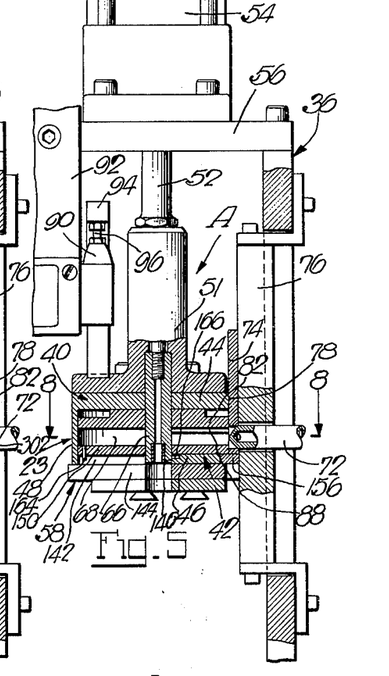
FIG. 5 is a fragmentary section through an operating device of the apparatus taken substantially on the line 5—5 of FIG. 4.
Figures 8, 10:
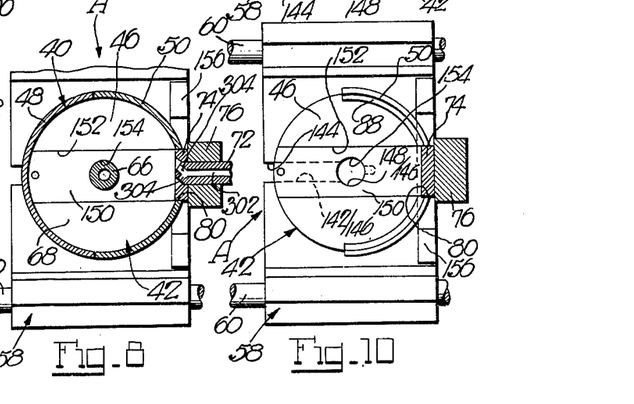
FIG. 8 is a section through the same operating device taken on the line 8—8 of FIG. 5.
FIG. 10 is a section taken on the line 10—10 of FIG. 9.
Figure 9:
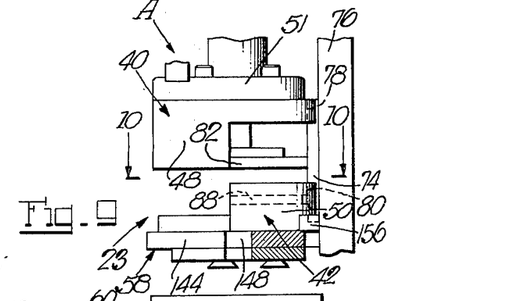
FIG. 9 is a side view of a prominent biscuit mold component of the same operating device.

Referring now more particularly to FIGS. 3 to 10, the biscuit forming device 22 provides a mold 23 having upper and lower companion parts 40 and 42, of which the upper part 40 is vertically movable downwardly onto and upwardly from the lower part 42 to close and open the mold, respectively. The mold parts 40 and 42 have flat bottoms 44 and 46, respectively, and are of fragmental cup shape by having only part-annular rims 48 and 50 on their respective bottoms 44 and 46 which, however, complement each other to form an uninterrupted annular rim in the closed mold (FIG. 8). The upper mold part 40 is for its operational vertical movements carried by a bracket 51 on a rod 52 of a plunger in a cylinder 54 on a support plate 56 of the main frame 37, while the lower mold part 42, which also serves to transfer a formed biscuit to the press 24, is to that end mounted on a carriage 58 which, in turn, is mounted for horizontal movement on guide bars 60 on a main slide 62, with this main slide being itself mounted for horizontal movement on guide bars 64 in the main frame 36 (FIGS. 1 to 4, 8 and 10). The upper mold part 40 carries a center core 66 for forming the closed mold cavity 68 ring-shaped (FIGS. 5 and 8). To charge the cavity 68 in the closed mold with plastic from an extruder 70 (FIGS. 1 and 2), the latter has a discharge nozzle 72 with its discharge end fittedly received in a vertical bar 74 on a support plate 76 on a rear upright of the main frame 36 (FIGS. 4 to 8), with the upper and lower mold parts 40 and 42 being in the rear apertured at 78 and 80 for fitted reception of the vertical bar 74 to admit plastic from the nozzle 72 into the closed mold cavity 68 (FIGS. 5 and 8) and close the latter at the rear apertures 78 and 80 in the upper and lower mold parts 40 and 42 (FIGS. 8 and 10), as will be readily understood.

Figures 6, 7:
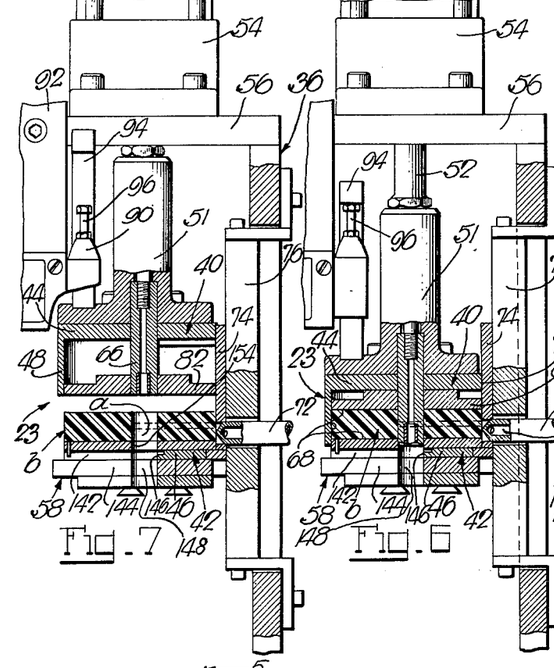
FIGS. 6 and 7 are sections similar to FIG. 5, with the operating device shown in different operating conditions.

The biscuit mold 23 is, in this instance, provided in the upper part 40 thereof with a biscuit stripper plate 82 which is normally urged into the eject position in FIGS. 4 and 7 by springs 84 that surround screws 86 by which the stripper plate is suspended from the bracket 51 with freedom to be depressed into the upper mold part all the way into engagement with the bottom 44 thereof (FIGS. 5 and 6). The part-annular rim 50 of the lower mold part 42 is provided with an inner peripheral rib formation 88, with the stripper plate 82 coming to rest on this rib formation 88 on the descent of the upper mold part 40 and, in consequence, becoming depressed thereinto on the continued descent of the latter into mold closing position (FIGS. 3 and 5).

With the carriage 58 and the lower mold part 42 being at the biscuit forming station A (FIGS. 3, 4 and 8 to 10), a ring-shaped biscuit b is formed on first closing the mold by action of the plunger in the cylinder 54 to lower the upper mold part 40 (FIG. 5), whereupon a charge of plastic under pressure is admitted into the closed mold cavity 68 through the nozzle 72, with this admitted plastic first filling the cavity 68 over the extent of its initial height in FIG. 5 and thereupon pressing against the stripper plate 82 to raise the same, and with it the upper mold part 40, to the maximum height of the mold cavity 68 at which the latter is still closed by the stripper plate 82 even though the upper mold part 40 has then been raised to clear the rim 50 of the lower mold part by the gap g (FIGS. 6 and 9A). Plastic is discharged from the nozzle 72 into the closed mold cavity 68 on opening a discharge valve (not shown) under the control of a switch 90 on a depending plate 92 on the frame support plate 56 (FIGS. 4 and 7). Thus, on lowering the upper mold part 40 to close the mold 23, an arm 94 on the bracket 51 depresses a pushbutton 96 of the switch 90 to close the latter (FIG. 5) and thereby open the discharge valve to inject plastic into the mold cavity 68, with plastic injection into the mold cavity continuing until the rising arm 94 permits spring-return of the pushbutton 96 to the position in FIG. 6 in which the switch 90 is opened to close the discharge valve, with the pushbutton 96 being vertically adjusted to open the switch 90 when on the rise of the upper mold part 40 the same reaches substantially the position in FIGS. 6 and 9A at which the formation of the biscuit b is concluded, including heightwise, while the mold cavity is still closed. However, on continued rise of the upper mold part 40 from the position in FIGS. 6 and 9A, the mold cavity 68 will be opened increasingly, not only at the bottom as at 98, but also higher up, and more particularly at the top as at 100 (FIG. 9B) to thereby directly expose the biscuit at the bottom and the stripper plate 82 at the top to surrounding cooling air, and more particularly to a customary blast of cooling air against the mold. This direct exposure of the formed biscuit b and of the stripper plate 82 to cooling air has a flash-like cooling effect on the biscuit which apparently is more skindeep than in depth, even at its contact with the air-cooled stripper plate, so that its surface tackiness, stemming from the injection of the plastic into the mold at fairly high injection temperature and, hence, plasticity, will quickly diminish to the point where the rim 48 and center core 66 of the rising upper mold part 40 will easily strip from the biscuit while the same is held down by the stripper plate, and the biscuit will separate as readily from the stripper plate when the same finally retracts therefrom after reaching on the continued rise of the upper mold part its aforementioned eject position in the latter (FIGS. 4 and 7). The formed biscuit b is thus most effectively surface-cooled for its ready separation without distortion from the rising upper mold part 40 and stripper plate 82 and its retention on the lower mold part in opening the mold, without sustaining any appreciable heat loss.

While the stripper plate 82 is, of course, advantageous in that the same makes for positive and, hence, unfailing separation of the rising mold part 40 from the formed biscuit on the lower mold part 42, the highly effective surface cooling of a formed biscuit, by virtue by opening the mold cavity not only at the bottom but also at the top to direct access of cooling air in the course of opening the mold, makes for reliable stripping of the rising upper mold part from a formed biscuit even without the benefit of a stripper plate in the upper mold part (FIG. 9C). In that case also, the featured cup form of both companion mold parts 40 and 42 is particularly advantageous in that in opening the mold at the end of a biscuit forming cycle, the ensuing upward movement of the fragmental rim 48 on the upper cup part 40 relative to the stationary rim fragment 50 on the lower cup part 42 produces some slight friction between these rim fragments and the respective outer peripheral biscuit surfaces which they bound, with the overall effect of this live friction on the biscuit favoring its release from the rising mold part 40 and, hence, avoiding any malfunction of the mold in binding a biscuit to the upper mold part from such friction cause.

As already mentioned, the lower mold part 42 also serves for the transfer of a formed biscuit b from the rearmost biscuit forming station A to the frontmost press station B, and the lower mold part 42 is to this end mounted on the aforementioned carriage 58 which is movable on the guide bars 60 on the main slide 62 relative to the latter and has independent forward and return strokes limited to a distance equal to the distance d between the biscuit forming and record trimming stations A and C, with the carriage 58 moving a biscuit through such distance on its operational forward stroke relative to the main slide 62. The main slide 62 is itself movable on the guide bars 64 in the main frame 36 and has operational forward and return strokes through a distance equal to the distance $d'$ between the foremost press station B and the intermediate record trimming station C (FIG. 2). Accordingly, while the formed biscuit is, for its transfer from the biscuit forming station A to the press station B, carried through a part, equal to $d$, of the overall distance between the stations A and B on the operational forward stroke of the carriage 58 relative to the main slide 62, the biscuit is carried through the remaining part, equal to $d'$, of this overall distance on the operational forward stroke of the main slide 62 while the carriage 58 is held thereon against movement relative to, and hence moves with, the main slide. The main slide 62 is moved through its operational forward and return strokes by a plunger 110 received in a fixed cylinder 112 in the main frame 36 and operatively connected at 114 with the main slide (FIG. 1), while the carriage 58 is moved through its operational forward and return strokes by a plunger 116 which is operatively connected with the carriage 58 as at 118, and received in a cylinder 120 on the main slide 62, with the plunger 116 and cylinder 120 thus linking the main slide 62 and carriage 58 (FIGS. 1 and 4).

The main slide 62 carries a turntable 122 with a center pin 124 which is suitably journalled in a casing 126 mounted on the main slide, with this turntable being adapted for transferring a pressed record r from the foremost press station B backwards to the intermediate record trimming station C, and also rotatably support a transferred record at the latter station for a flash trimming operation thereon. Thus, the empty turntable 122 is, on an operational forward stroke of the main slide 62, advanced from the station C into the open press 24 in position therein to receive a just pressed record, with the center pin 124 on the turntable then being in alignment with the vertical reference axis of $x$ of the press (FIG. 2) on which is centered a center hole $h$ in each record formed in the press, so that on the release of a pressed record from the press by vertically lowering the same from the upper press platen 130, the released record will come to rest on the turntable with its center hole h in register with the center pin 124. To thus release a pressed record from the open press 24 onto the turntable 122 in register with the center pin 124 thereon, there are provided on the press opposite pairs of grippers 132 (FIG. 2) which are actuated to grip diametrically opposite portions of the peripheral flash on the record while the same is being formed in the press, and to lower the pressed record vertically onto the turntable 122 in the open press, all as more fully disclosed in our prior U.S. Pat. No. 3,862,815.

The appropriate timing for transferring a formed biscuit into the open press is simultaneously, or nearly simultaneously, with the forward stroke of the main slide 62 and empty turntable 122 thereon from the record trimming station C to the press station B, with the carriage 58 being to this end moved through its independent forward stroke in suitably timed relation with the forward stroke of the main slide 62, with this timed relation being preferably such that the carriage 58 arrives at the press station B simultaneously with, or very shortly after, the arrival of the main slide 62 at the press station B. With the carriage 58 being at the press station B, the biscuit b on the lower mold part 42 is with its center aperture a (FIG. 7) aligned with a press pin 140 in the lower press platen 128 (FIG. 2), with this press pin being, after the arrival of the carriage 58 in the open press, projected upwardly through the aperture a in the biscuit to hold the latter in the press and strip it from the lower mold part 42 on the following return movement of the carriage 58 from the press, with the biscuit then dropping onto the lower press platen as shown in FIG. 2. Thus, after releasing a pressed record from the open press onto the turntable 122 and projecting the press pin 140 through the center aperture in a transferred biscuit, the main slide 62 and carriage 58 are moved through their respective return strokes, thereby returning the turntable 122 with the pressed record thereon to the record trimming station C for a flash trimming operation on the record, and returning the lower mold part 42 to the biscuit forming station A for molding the next biscuit.

As described, a biscuit transferred into the open press is retained therein by upward projection of the press pin through the center aperture in the biscuit so that on the return movement of the carriage 58 with the lower mold part 42, the press pin holds the biscuit for strip-off from the lower mold part. In order to provide clearance for the press pin 140 in the lower mold part 42 and also in the carriage 58 for its projection through the center aperture in a transferred biscuit in the open press and also for the return movement of the carriage and lower mold part from the open press, the lower mold part 42 and the carriage 58 are provided with identical clearance slots 142 and 144 which are open in the direction of their biscuit transfer movement to the press and lead to center apertures 146 and 148, respectively, in these parts 42 and 58 (FIGS. 5 and 8 to 10). Thus, these slots 142 and 144, including the respective center apertures 146 and 148, must be exposed at the open press to clear the press pin 140 on its projection through a delivered biscuit and also while the same remains thus projected on the following return movement of the carriage 58 and lower mold part 42 from the open press. However, these slots 142 and 144, including the center apertures 146 and 148, in the lower mold part 42 and carriage 58 must be closed at the biscuit forming station A in order to close the mold cavity 68 thereat for the formation of a biscuit b therein. To the latter end, the lower mold part 42 is provided with a slide 150 which is movable in a guideway 152 in the bottom 46 of the lower mold part (FIGS. 4, 5, 8 and 10), with this slide 150 having a central aperture 154 and being, in the position of the lower mold part at the biscuit forming station A, in cover relation with the slot 142 in this lower mold part (FIGS. 5, 8 and 10), but being with its center aperture 154 then aligned with the center apertures 146 and 148 in the lower mold part 42 and carriage 58. However, the mold cavity 68 will be closed also at the center aperture 154 in the slide 150 by the center core 66 which, on the descent of the upper mold part 40 into mold closing position, will fittedly be received in this center aperture 154 in the slide 150 (FIGS. 5 and 8). Thus, while the slide 150 must cover the clearance slot 142 in the lower mold part 42 at the biscuit forming station A, this slide must, on the biscuit transfer movement of the carriage 58 and lower mold part 42 thereon to the press, be shifted to uncover the clearance slot 142 and also the center aperture 146 in the lower mold part. To the latter end, the slide 150 carries a crossbar 156 at its rear end (FIGS. 4, 5 and 8 to 10), and there are provided transversely spaced stop lugs 158 (FIG. 3) which are in the path of the opposite ends of the crossbar 156 (FIG. 4) on movement of the carriage 58 and lower mold part 42 toward the press, with these stop lugs 158 being engaged by the opposite ends 156a of the crossbar 156 (FIG. 4) to shift the slide 150 into a retracted position in which to uncover the clearance slots 142 and 144 and center apertures 146 and 148 in the thus moving lower mold part 42 and carriage 58. Preferably, the stop lugs 158 are carried by the main slide 62 at a location thereon to complete shifting of the slide 150 into its retracted position when the carriage 58 and lower mold part 42 reach the press station B. The slide 150 is shifted into the advanced slot-closing position in FIGS. 5, 8 and 10 when on the return movement of the carriage 58 and lower mold part 42 to the biscuit forming station A the crossbar 156 comes to rest against the support plate 76. In order to avoid overtravel of the slide 150 from the lower mold part 42 on its shift into retracted position by the stop lugs 158, the slide 150 is at its front end provided with a depending pin 164 which on the retraction of the slide moves into a stop groove 166 in the bottom 46 of the lower mold part 42 (FIGS. 5 and 10).

The present record producing apparatus is also provided with supply stacks st and sb of top and bottom record labels on supports 168 and 170 on the top ends of plungers 172 and 174 in fixed cylinders 176 and 178 in the main frame 36 (FIGS. 2 and 3). Provisions are also made to transfer, with each biscuit, a top label and a bottom label from the supply stacks st and sb to the press for their molding therein, with the biscuit, into a pressed record with top and bottom labels. However, these provisions need no description here because they form no part of the present invention, but they are fully disclosed in our prior U.S. Pat. No. 3,862,815.

Following the return strokes of the main slide 62 with a pressed record r on the turntable 122, and of the carriage 58 with the empty lower mold part 42, into the respective record trimming and biscuit forming stations C and A, the open press 24 closes to mold a delivered biscuit and top and bottom labels into a labeled record r with peripheral flash f, a flash trimming operation is performed on the record on the turntable 122 at the station C, and a biscuit is being formed at the station A (FIG. 3).

For trimming the flash f from a record r on the turntable 122 at the station C, the record is driven, by being pressed between the turntable 122 and a rotary top disc 180 of which one is power-driven. In this instance, it is the turntable 122 which is power-driven by a motor 182 on the main slide 62, with this motor having a pulley 184 which through a belt 186 is drivingly connected with a pulley 188 on the turntable 122, and the motor being suitably controlled for the drive of the turntable during a trimming operation on the record. The top disc 180 is carried by a rotary spindle 190 which is journalled and axially movable in a bearing 192 in an overhead bracket 194 and in a bearing block 196 which is suspended from the overhead bracket 194 by rods 198 (FIGS. 1 to 3). The top end of the spindle 190 has a rotary connection 200 with the lower end of a plunger 202 in a cylinder 204 on the bracket 194, with the plunger 202 being operable to shift the top disc 180 vertically into lower and raised positions in which the same is in pressing engagement with a record on the turntable 122 and is retracted from the latter, respectively. There are also provided flash trimming tools 206 in the form of companion shear blades 208 and 210 and a cutting blade 212 (FIGS. 14 to 16), of which shear blade 208 is fixedly mounted on a support member 214 of the main frame 36, and the other shear blade 210 is at 216 pivotally mounted on the blade 208, while the cutting blade 212 is by arms 219 carried by the shear blade 210 for pivotal movement therewith. The fixed shear blade 208 is with its shear edge 220 extending substantially radially of and closely beneath the peripheral flash f of a record r pressed between the turntable 122 and top disc 180 for cooperating with its companion shear blade 210 into shearing into the record flash as at 222 while the record non-driven (FIG. 16) on rocking the blade 210 from the retracted position in FIG. 14 into the shearing position in FIG. 15, with the cutting blade 212 being then also brought into cutting relation with the record (FIGS. 15 and 16) to trim off the flash $f$ along the dot-and-dash line 224 on the following friction drive of the record. The shear blade 210 is rocked into its retracted and shearing positions by actuation of a plunger 226 in a cylinder 228 which at 230 is pivotally mounted on a bracket 232 on the support member 214.

The top disc also serves to transfer a trimmed record from the trimming station C to the record stacker 28 at the stacking station D. To that end, the top disc 180 is provided with record holding means 240 (FIGS. 3 and 11 to 13), and the overhead bracket 194, which carries the top disc for its rotary and axial movements, is mounted on an overhead carriage 242 (FIGS. 1 to 3) which is movable horizontally, from the record trimming station C to the record stacking station D and vice versa, on parallel guide bars 246 which are suitably mounted with their ends on the main frame 36 as at 248. The overhead carriage 242, and with it the top disc 180, are thus moved by actuation of a plunger 250 in a cylinder 252, of which the plunger 250 is at 254 connected with the carriage 242, and the cylinder 252 is suitably mounted on the main frame 36 as at 256.

Figures 11, 13:
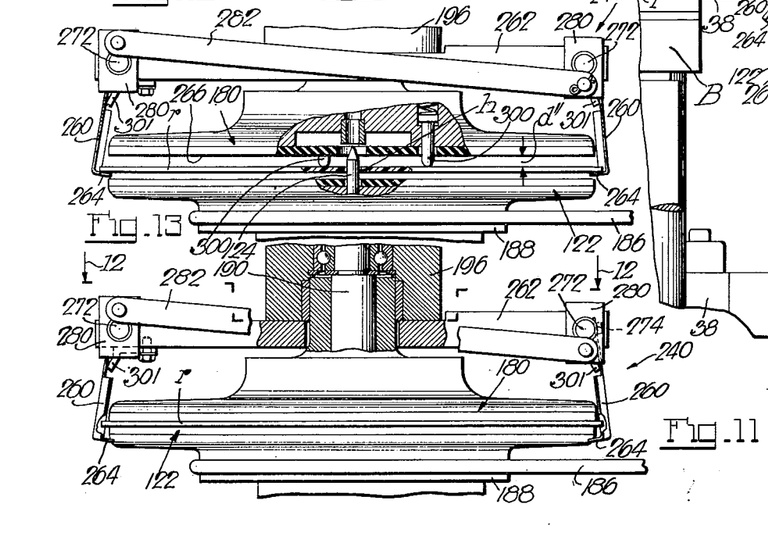
FIG. 11 is an enlarged fragmentary view, partly in section, of part of another operating device of the apparatus.
FIG. 13 is a view similar to FIG. 11, showing the other operating device in a different operating position.
Figure 12:
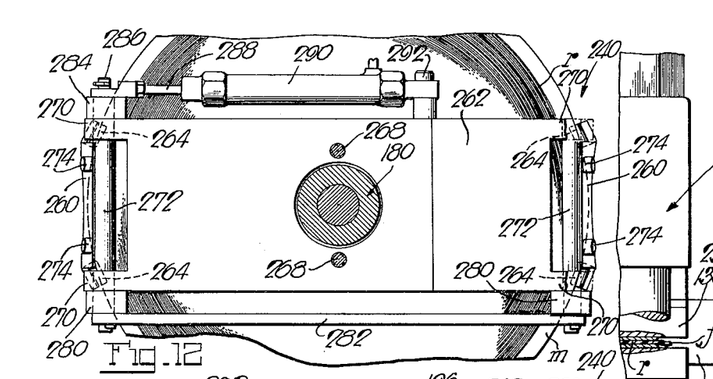
FIG. 12 is a fragmentary section through the other operating device taken substantially on the line 12—12 of FIG. 11.

The record holding means 240 on the top disc 180 are in the form of hangers 260 on a carrier 262, with the hangers 260 featuring ledges 264 on which a trimmed record r rests at a distance below the bottom face 266 of the top disc 180 for its hold by the latter during transfer to the stacking station D. The carrier 262, which in this instance is mounted on the non-turning bearing block 196 by screws 268 (FIG. 12), has at its opposite ends spaced bearing lugs 270 for shafts 272 on which the hangers 260 are mounted by screws 274, with each of these hangers 260 being provided at its lower end with two inwardly projecting ledges 264 which are spaced from each other peripherally of a trimmed record thereon as shown in FIG. 12. The hangers 260 are rockable into record support and release positions in which their ledges 264 are, in relation to the top disc 180 in its lower position, just outside the periphery of the turntable and spaced below but in vertical alignment with the uniform peripheral margin m of a trimmed record (FIGS. 11 and 12), and outside the peripheral flash on a pressed record (FIG. 3), respectively. To the end of thus rocking the hangers 260, the ends of their shafts 272 carry on one side of the carrier 262 rockers 280 which are operatively connected by a link 282, and one of these shafts 272 carries at its other end another rocker 284 which at 268 is connected with a plunger 288 in a cylinder 290 that is pivotally mounted on the carrier 262 as at 292 (FIG. 12).

Thus, while a record is being trimmed while being driven, the hangers are in their record release position (FIG. 3) and, hence, do not interfere with the performance of the flash trimming tools 206 (FIG. 2). On conclusion of the trimming operation, the hangers 260 are, by action of the plunger 288, shifted to their record support position (FIGS. 11 and 12) so that on the following operational rise of the top disc 180 the latter will separate from the record before the ledges 264 engage the record and lift it off the turntable. The trimmed record will thus rest on and be supported by the ledges 264 during continued rise of the top disc 180 to its upper position and during its transfer to the stacking station D on the record transfer stroke of the overhead carriage 242 by action of the plunger 250. On arrival of the carriage 242 at the stacking station D, the trimmed record is above, and with its center hole $h$ aligned with, the stacker 28 which is in the preferred form of a vertical spindle, so that on the subsequent shift of the hangers 260 to their record release position the trimmed record will drop onto the stacking spindle.

In the course of the friction drive of a record for a flash trimming operation there is generated in the driving and driven parts static electricity with its characteristic side effect of attraction between the parts. This attraction, while light, will prevail between the top disc 180 and a trimmed record carried thereby if the latter is in engagement or near engagement with the bottom face of the top disc, in which case such attraction will occasionally cause sufficient inertial disturbance of a record to divert it from and thereby miss the stacking spindle on release of the record and drop from the top disc at the stacking station. In order to avoid this, the attraction, due to static electricity, between the top disc 180 and a trimmed record carried thereby is broken when the record is lifted from the turntable 122 after the top disc has already been raised and, hence, separated from the record a distance $d''$ (FIG. 13) which is sufficient to break the attraction between top disc and record. Furthermore, in order to assure full separation between the record and top disc on the initial rise of the latter, the top disc 180 is preferably provided with a plurality of spring-urged plungers 300 (FIG. 13) which additionally function to lock the record to the ledges 264 in its centered position on the turntable and thereby deliver the record to the stacking station in accurate alignment with the stacking spindle. The hangers 260 in their record support position preferably bear against adjustable stop lugs 301 on the carrier 262 for accurate adjustment of the hangers relative to each other as well as to keep their ledges 264 out of engagement with the periphery of the turntable 122 (FIG. 11).

Referring again to the biscuit mold 23 in FIGS. 5 to 10, the plastic injection nozzle 72 has a passage 302 with a slanting discharge end 304 (FIG. 8) through which plastic is directed substantially horizontally into the mold cavity 68 to one side of the center core 66 for the flow of the plastic charge in the mold cavity around the center core with ensuing most uniform distribution of the plastic charge throughout the cavity. Preferably, the passage 302 in the nozzle 72 has two discharge ends 304 which diverge from each other to direct the plastic charge to opposite sides of the center core 66 in the mold cavity 68 for the flow of the injected plastic in opposite directions around the center core.

What is claimed is:

1. In record producing apparatus, the combination of a turntable at a first station having a vertical axis and a center pin and being adapted to receive a pressed record with peripheral flash and a center hole located on said center pin; a top disc at said first station having a bottom face and being rotary about a vertical axis in line with said turnable axis and movable axially into upper and lower positions in which its bottom face is retracted from and pressed against a record on said turntable, respectively, with said turntable and top disc constituting companion drive elements of which one is power-driven for the friction drive of a record pressed between said elements; means at said first station operative to trim the flash from a record on its friction drive to leave the trimmed record with a uniform peripheral margin outside the turntable periphery; a stacker at a second station; and means to transfer a trimmed record from said turntable to said stacker, including said top disc, and further providing a carriage mounting said top disc for said rotation and axial movement thereof, and being guided for movement into first and second positions in which said top disc is at said first and second stations, respectively, a record holder providing a carrier mounted on and movable with said top disc but independently turntable about said disc axis, a spline connection between said carriage and carrier to hold the latter against rotation in any axial position of said top disc, hangers having bottom ledges and being supported on said carrier for movement into record support and release positions in which said bottom ledges are, in relation to said top disc in said lower position at said first station, outside the outer periphery of said turntable and spaced below, but in vertical alignment with, peripheral portions of said peripheral margin of a trimmed record on the turntable, and outside the peripheral flash of a pressed record on the turntable, respectively, with said spacing of said bottom ledges of the hangers below said peripheral margin of a trimmed record on the turntable being such that the ensuing gap between the resting record on the bottom ledges and the bottom face of the top disc on its rise into said upper position is sufficient to interrupt any attraction between top disc and record due to static electricity generated in the top disc on the friction drive of the record, and means operative to shift said hangers simultaneously into said support and release positions, respectively, whereby on the rise of the top disc at said first station from said lower position the bottom ledges on the hangers in their record support positions lift a trimmed record from the turntable and support it on continued rise of the top disc to said upper position and during movement of said carriage from said first position into said second position in which the supported record is above and in receiving alignment with said stacker for its drop thereon on shifting said hangers to said release positions.

2. The combination in record producing apparatus as in claim 1, in which said stacker is a vertical spindle, and in said second carriage position said supported record is in receiving alignment with said stacker by being with its center hole vertically aligned with said spindle.

3. The combination in record producing apparatus as in claim 1, which further provides spring-urged plungers in said top disc urging a record away from the bottom face thereof and into seating engagement with said bottom ledges in said record support positions of said hangers on the rise of said top disc from the turntable.

4. The combination in record producing apparatus as in claim 1, in which said hangers are above their bottom ledges pivoted to said carrier about horizontal axes for their turning movement into said record support and release positions.

* * * * *